(12) United States Patent
Mons

(10) Patent No.: US 7,649,813 B2
(45) Date of Patent: *Jan. 19, 2010

(54) ACCESSING AUDIO-CENTERED INFORMATION USING A MULTILEVEL TABLE-OF-CONTENTS MECHANISM AND DIRECTORY STRUCTURES

(75) Inventor: Johannes Jan Mons, Hilversum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 4 days.

This patent is subject to a terminal disclaimer.

(21) Appl. No.: 11/682,524

(22) Filed: Mar. 6, 2007

(65) Prior Publication Data

US 2007/0147190 A1 Jun. 28, 2007

Related U.S. Application Data

(63) Continuation of application No. 10/039,713, filed on Oct. 29, 2001, now Pat. No. 7,196,976, and a continuation of application No. 09/355,379, filed on Jul. 26, 1999, now Pat. No. 6,353,580.

(30) Foreign Application Priority Data

Nov. 29, 1997 (EP) .................................. 97203746

(51) Int. Cl.
*G11B 21/08* (2006.01)
(52) U.S. Cl. ................... 369/30.04; 369/275.3
(58) Field of Classification Search .............. 369/30.04, 369/275.3, 30.05–30.09
See application file for complete search history.

(56) References Cited

U.S. PATENT DOCUMENTS

| 5,210,734 | A | 5/1993 | Sakurai |
|---|---|---|---|
| 5,384,674 | A | 1/1995 | Nishida |
| 5,475,668 | A | 12/1995 | Azumatani |
| 5,650,991 | A | 7/1997 | Fujiie |
| 5,754,521 | A | 5/1998 | Yokota |
| 5,848,038 | A | 12/1998 | Igarashi |
| 5,867,466 | A | 2/1999 | Igarashi |
| 6,016,295 | A | 1/2000 | Endoh |
| 6,072,759 | A | 6/2000 | Maeda |
| 6,275,457 | B1 | 8/2001 | Maeda |
| 6,353,580 | B1 | 3/2002 | Mons |

(Continued)

FOREIGN PATENT DOCUMENTS

EP 0402973 A1 12/1990

(Continued)

OTHER PUBLICATIONS

J.J. Van Der Kam, "A Digital Decimating Filter for Analog-to-Digital Conversion of Hi-Fi Audio Signals", Philips Tech. Rev. 42, No. 6/7, pp. 230-238, Apr. 1986.

(Continued)

*Primary Examiner*—Tan X Dinh

(57) ABSTRACT

Audio-centered information is stored on a unitary medium by a Table-of-Contents (TOC) mechanism for specifying an actual configuration of various audio items on the medium. In addition to the TOC mechanism a file-based access mechanism to the information is assigned through a ROOT directory that contains a highest level TOC directory pointing at various audio items.

8 Claims, 4 Drawing Sheets

U.S. PATENT DOCUMENTS

Figure 1A:
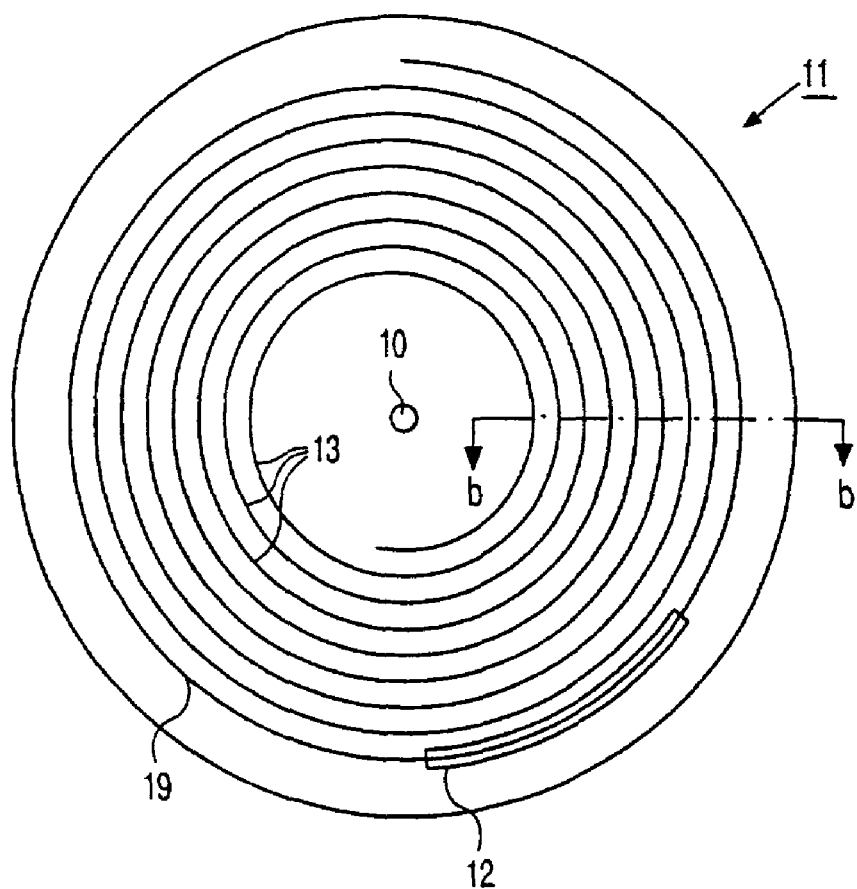

| | | |
|---|---|---|
| 6,370,090 B1 | 4/2002 | Verbakel |
| 6,522,695 B1 | 2/2003 | Bruekers |
| 6,633,515 B1 * | 10/2003 | Van Nieuwenhoven et al. .. 369/30.04 |
| 7,263,051 B2 * | 8/2007 | Verbakel et al. .......... 369/59.25 |
| 2007/0127321 A1 * | 6/2007 | Verbakel et al. .......... 369/30.03 |

FOREIGN PATENT DOCUMENTS

| | | |
|---|---|---|
| EP | 0486331 A2 | 5/1992 |
| EP | 0640960 A2 | 3/1995 |
| EP | 0676761 A1 | 10/1995 |
| JP | 11297041 A1 | 4/1998 |
| WO | 9701156 A1 | 1/1997 |
| WO | 9701303 A1 | 1/1997 |
| WO | 9928911 A2 | 6/1999 |

OTHER PUBLICATIONS

Kirk C-H Kam "A Higher Order for Interpolative Modulators for Oversampling A/D Converters", IEEE Transactions on Circuits and Systems, vol. 37, No. 3, Mar. 1990.

"Variable Transport Speed Recording", Research Disclosure, Aug. 1994.

* cited by examiner

|  | # bytes | format |
|---|---|---|
| Master_TOC () { | | |
|     Master_TOC_0 () | 2048 | Master_TOC_0 |
|     for (c=1;c<=8; c++) | | |
|     { | | |
|         Master_Text [c] | 2048 | Master_Text |
|     } | | |
|     Manuf_Info () | 2048 | Manuf_Info |
| } | | |

FIG. 7A
(Table 1)

|  | # bytes | format | value |
|---|---|---|---|
| Master_TOC_0 () { | | | |
|     M_TOC_0_Header () | 16 | M_TOC_0_Header | |
|     Album_Info () | 48 | Album_Info | |
|     Disc_Info () | 64 | Disc_Info | |
|     Text_Channels () | 40 | Text_Channels | |
|     Reserved | until 2048 | Uint8 | 0 |
| } | | | |

FIG. 7B
(Table 2)

|  | # bytes | format | value |
|---|---|---|---|
| Disc_Info () { | | | |
|     2CH_TOC_1_Address | 4 | Uint32 | |
|     2CH_TOC_2_Address | 4 | Uint32 | |
|     MC_TOC_1_Address | 4 | Uint32 | |
|     MC_TOC_2_Address | 4 | Uint32 | |
|     Disc_Flags () | 1 | Disc_Flags | |
|     Reserved | 3 | Uint8 | 0 |
|     2CH_TOC_Len | 2 | Uint16 | |
|     MC-TOC_Len | 2 | Uint16 | |
|     Disc_Catalog_Number | 16 | String | |
|     Disc_Genre () | 16 | Genre4 | |
|     Disc_Date | 4 | Date | |
|     Reserved | 4 | Uint8 | 0 |
| /*** Disc text files are in Master_Text [c] with c=1..8***/ | | | |
| } | | | |

FIG. 7C
(Table 3)

ACCESSING AUDIO-CENTERED INFORMATION USING A MULTILEVEL TABLE-OF-CONTENTS MECHANISM AND DIRECTORY STRUCTURES

A method and device for storing audio-centered information by a Table-of-Contents (TOC) mechanism and also by a file-based access mechanism through a ROOT directory that contains a highest level TOC directory, and a unitary storage medium containing such information.

The invention relates to a unitary storage medium and a method for storing on such a medium. Digital audio storage on unitary media such as disc or tape is at present widespread. If the audio is effectively sub-divided into multiple sub-items, the providing of a Table-of-Contents (TOC) allows to access the information in a relatively fast manner. Generally, a TOC file specifies at least what has been stored and where it has been stored, for facilitating access thereto in a home-type player. A lowest level TOC file, that in case of a single-level TOC structure is also the highest level TOC file, thereby points immediately to the content of the audio items or tracks. Now, such audio signals are also being used in the environment of personal computers and the like, where the scope of such use may have various extended features. An audio provider may wish to have such information straightforwardly accessible through various platforms as different as a portable player from a full-fledged multi-media engine.

In consequence, amongst other things, it is an object of the present invention to allow audio management on levels of different complexity, through providing parallel but compatible accessibility to players as well as to PC's, and in particular, through the latter's file structure. Now therefore, according to one embodiment, a lowest level directory, that in case of a single level directory structure is also the highest level or ROOT directory, contains localizing information of the associated audio items or tracks. However, such lowest level directory cannot access immediately the audio content of these tracks, but would need the appropriate application program to execute an interpretation with respect to the pertaining audio file.

Advantageous features of other embodiments are to provide a multi-level TOC structure, as well as a multi-level directory structure for raising access flexibility.

The embodiments also relate to a unitary storage medium produced by the method, and to a reader or player arranged for interfacing with such storage medium. Further advantageous aspects of the invention are recited in dependent Claims.

Figure 1B:
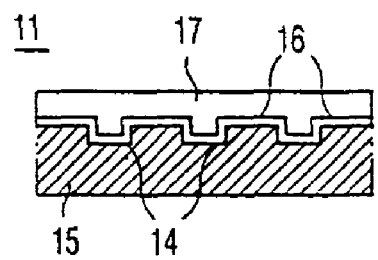
Figure 2:
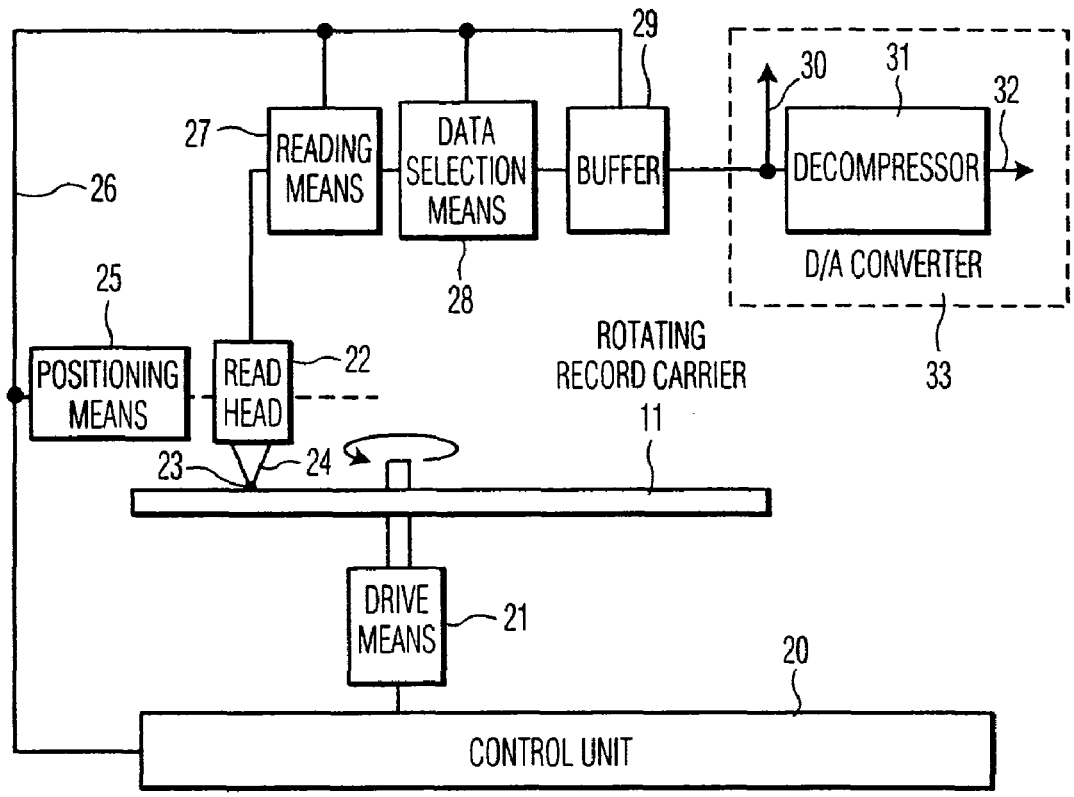
Figure 3:
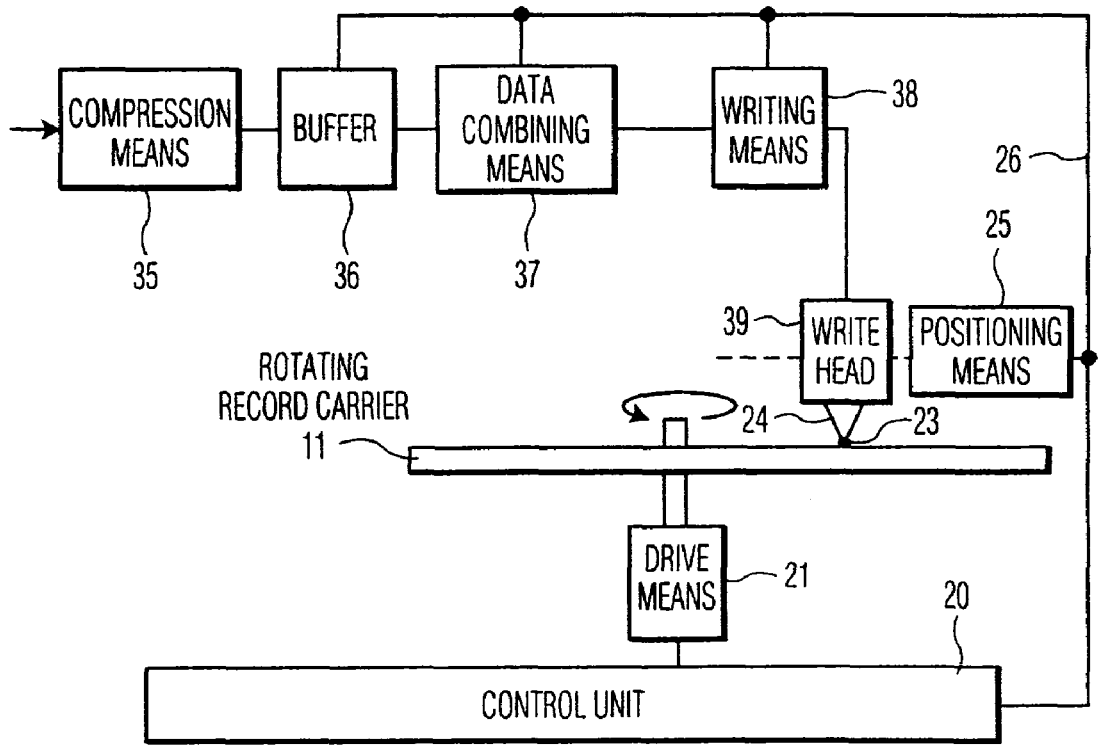
Figure 4:
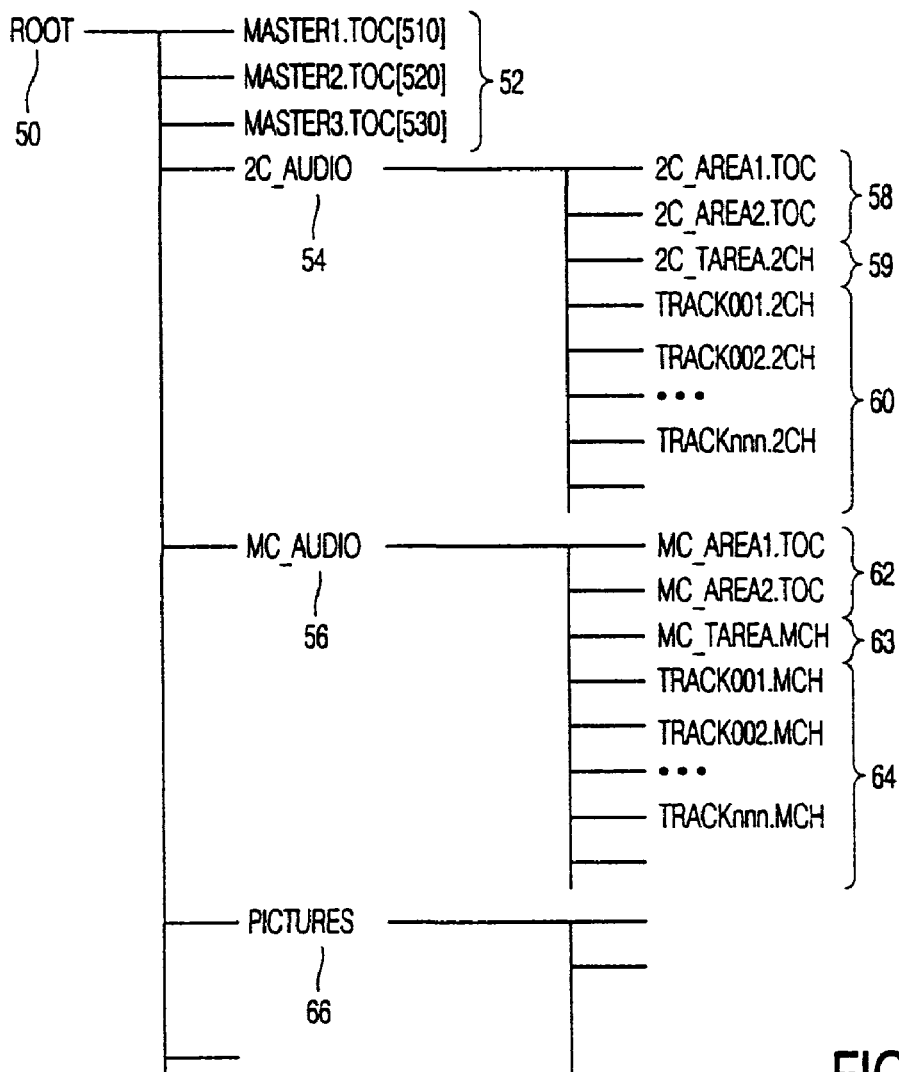
Figure 5:
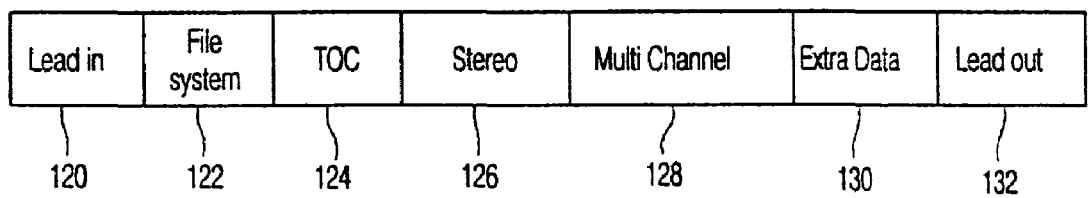
Figure 6:
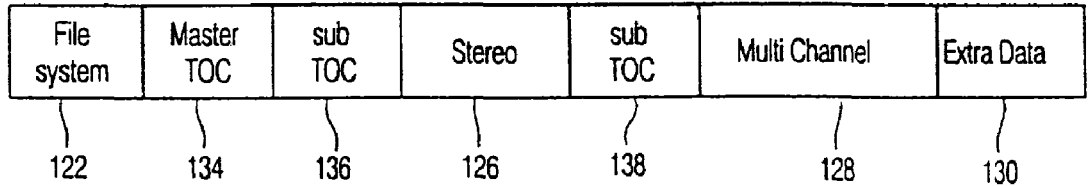

These and further aspects and advantages of the invention will be discussed more in detail hereinafter with reference to the disclosure of preferred embodiments, and in particular with reference to the appended Figures that show:

FIGS. 1a, 1b a record carrier;
FIG. 2 a playback device;
FIG. 3 a recording device;
FIG. 4, a file system for use with the invention;
FIG. 5, a first storage arrangement for the invention;
FIG. 6, a second storage arrangement for the invention.
FIG. 7A specifies a Master_TOC Syntax;
FIG. 7B specifies a Master_TOC_O Syntax;
FIG. 7C specifies a Disc_Info Syntax.

FIG. 1a shows a disc-shaped record carrier 11 with track 19 and central hole 10. Track 19 is arranged in a spiral pattern of turns forming substantially parallel tracks on an information layer. The carrier may be an optical disc with a recordable or a prerecorded information layer. Examples of a recordable disc are CD-R, CD-RW, and DVD-RAM, whereas audio CD is a prerecorded disc. Prerecorded discs can be manufactured by first recording a master disc and later pressing consumer discs. Track 19 on the recordable record carrier is indicated by providing a pre-embossed track structure during manufacture of the blank record carrier. The track may be configured as a pregroove 14 to enable a read/write head to follow the track 19 during scanning. The information is recorded on the information layer by optically detectable marks along the track, e.g. pits and lands.

FIG. 1b is a cross-section along the line b-b of a recordable record carrier 11, wherein transparent substrate 15 carries recording layer 16 and protective layer 17. The pregroove 14 may be implemented as an indentation, an elevation, or as a material property deviating from its surroundings.

For user convenience, the audio information on the record carrier has been subdivided into items, which usually have a duration of a few minutes e.g. songs on an album or movements of a symphony. Usually the record carrier also contains access information for identifying the items, such as in a so-called Table Of Contents (TOC), or included in a file system like ISO 9660 for CD-ROM. The access information may include playing time and start address for each item, and also further information like a song title.

The TOC access mechanism specifies an actual configuration of various audio items on the unitary storage medium (e.g., the record carrier 1 I). Stored on the unitary storage medium is a highest level TOC file that points to the audio items, and a lowest level TOC file that points immediately to the respective contents of the audio items. Also stored on the unitary storage medium is a file-based access mechanism that includes a root directory containing item localizing information, and the root directory contains the highest level TOC file. The audio information is accessible using either the TOC access mechanism or the file-based access mechanism.

The audio information is recorded in digital representation after analog to digital (A/D) conversion. Examples of A/D conversion are PCM 16-bit per sample at 44.1 kHz known from CD audio and 1 bit Sigma Delta modulation at a high oversampling rate e.g. 64×Fs called bitstream. The latter method represents a high quality encoding method, with the choice between high quality decoding and low quality decoding, the latter allowing a simpler decoding circuit. Reference is made in this respect to documents D5 and D6, infra. After A/D conversion, digital audio is compressed to variable bitrate audio data for recording on the information layer. The compressed audio data is read from the record carrier at such a speed, that after decompression substantially the original timescale will be restored when reproducing the audio information continuously. Hence the compressed data must be retrieved from the record carrier at a speed dependent on the varying bitrate. The data is retrieved from the record carrier at so-called transfer speed, i.e. the speed of transferring data bytes from the record carrier to a de-compressor. Preferably the record carrier has a constant spatial data density, which gives the highest data storage capacity per unit of area. In such system the transfer speed is proportional to the relative linear speed between the medium and the read/write head. If a buffer is provided before the de-compressor, actual transfer speed is the speed before that buffer.

FIG. 2 shows a playback apparatus according to the invention for reading a record carrier 11 of the type shown in FIG. 1. The device has drive means 21 for rotating record carrier 11 and a read head 22 for scanning the record carrier track. Positioning means 25 effect coarse radial positioning of read head 22. The read head comprises a known optical system with a radiation source for generating a beam 24 that is guided through optical elements and focused to spot 23 on an information layer track. The read head further comprises a focusing actuator for moving the focus of the radiation 24 along the optical axis of the beam and a tracking actuator for fine positioning of spot 23 in a radial direction on the centre of the track. The tracking actuator may comprise coils for moving an optical element or may be arranged for changing the angle of a reflecting element. The radiation reflected by the information layer is detected by a known detector in the read head 22, e.g. a four-quadrant diode, to generate a read signal and further detector signals including a tracking error and focusing error signals for the tracking and focusing actuators, respectively. The read signal is processed by a reading means 27 to retrieve the data, which reading means are of a usual type for example comprising a channel decoder and an error corrector. The retrieved data is passed to a data selection means 28, to select the compressed audio data for passing on to buffer 29. The selection is based on data type indicators also recorded on the record carrier, e.g. headers in a framed format. From buffer 29, the compressed audio data are passed on to de-compressor 31 as signal 30. This signal may also be outputted to an external de-compressor. De-compressor 31 decodes the compressed audio data to reproduce the original audio information on output 32. The de-compressor may be fitted separately, e.g. in a stand-alone high quality audio digital to analog convertor (D/A convertor), as indicated by dashed rectangle 33 in FIG. 2. Alternatively, the buffer may be positioned before the data selection means. The buffer 29 may be positioned in a separate housing or may be combined with a buffer in the decompressor. The device furthermore has a control unit 20 for receiving control commands from a user or from a host computer not shown, that via control lines 26 such as a system bus is connected to drive means 21, positioning means 25, reading means 27 and data selection means 28, and possibly also to buffer 29 for buffer filling level control. To this end, the control unit 20 may comprise control circuitry, such as a microprocessor, a program memory and control gates, for performing the procedures described below. Control unit 20 may be implemented as a logic circuit state machine.

The art of audio compression and de-compression is known. Audio may be compressed after digitizing by analyzing the correlation in the signal, and producing parameters for fragments of a specified size. During de-compression the inverse process is used to reconstruct the original signal. If the original digitized signal is reconstructed exactly, the (de-) compression is called lossless, whereas lossy (de)-compression will not reproduce certain details of the original signal which however are substantially undetectable by the human ear or eye. Most known systems for audio and video, such as DCC or MPEG, use lossy compression, whereas lossless compression is used for storing computer data. Examples of audio compression and decompression can be found in D2, D3 and D4 hereinafter, of which in particular the lossless compression from D2 is suitable for high quality audio.

According to the invention, data selection means 28 are arranged to retrieve from the data read certain control information. The data selection means 28 are also arranged to discard any padding or stuffing data, that had been added during recording. When the control unit 20 is commanded to reproduce an item of audio from the record carrier, the positioning means 25 are controlled to position the reading head on the portion of the track containing the TOC. The starting address for that item will then be retrieved from the TOC via the data selection means 28. Alternatively the contents of the TOC may be read only once and stored in a memory when the disc is inserted in the apparatus. For reproducing the item, the drive means 21 are controlled to rotate the record carrier at the appropriate speed indicated through extracting time codes stored with the audio, that indicate an intended duration.

To provide continuous reproduction without buffer underflow or overflow the transfer speed is coupled to the reproduction speed of the D/A converter, i.e. to the bitrate after decompression. To this end the apparatus may comprise a reference frequency source for controlling the decompressor. Alternatively or additionally the rotation rate may be adjusted using the average filling level of the buffer 29, e.g. decreasing the rotation rate when the buffer is more then 50% full on average.

FIG. 3 shows a recording device for writing information on a record carrier 11 according to the invention of a type which is (re)writable. During a writing operation, marks representing the information are formed on the record carrier. The marks may be in any optically readable form, e.g. in the form of areas whose reflection coefficient differs from their surroundings, through recording in materials such as dye, alloy or phase change, or in the form of areas with a direction of magnetization different from their surroundings when recording in magneto-optical material. Writing and reading of information for recording on optical disks and usable rules for formatting, error correcting and channel coding, are well-known, e.g. from the CD system. Marks may be formed through a spot 23 generated on the recording layer via a beam 24 of electromagnetic radiation from a laser diode. The recording device comprises similar basic elements as described with reference to FIG. 2, i.e. a control unit 20, drive means 21 and positioning means 25, but it has a distinctive write head 39. Audio information is presented on the input of compression means 35, which may be placed in a separate housing. Suitable compression has been described in D2, D3 and D4. The variable bitrate compressed audio on the output of the compression means 35 is passed to buffer 36. From buffer 36 the data is passed to data combining means 37 for adding stuffing data and further control data. The total data stream is passed to writing means 38 for recording. Write head 39 is coupled to the writing means 38, which comprise for example a formatter, an error encoder and a channel encoder. The data presented to the input of writing means 38 is distributed over logical and physical sectors according to formatting and encoding rules and converted into a write signal for the write head 39. Unit 20 is arranged for controlling buffer 36, data combination means 37 and writing means 38 via control lines 26 and for performing the positioning procedure as described above for the reading apparatus. Alternatively the recording apparatus may be arranged for reading having the features of the playback apparatus and a combined write/read head.

FIG. 4 shows a file system for use with the invention, for which in principle various options exist. As main choice the inventor has proposed that the storage medium should be based on either the UDF file system or the ISO 9660 file system, or both, which systems are by themselves standard to the skilled art person. In the alternative case, no file system should be present at all and the relevant sector spaces should be kept empty.

If a file system is present however, all audio will be stored in Audio Files. FIG. 4 has a double accessing hierarchy, as follows, Firstly, ROOT directory 50 points to MASTER TOC files 52 and furthermore to subaltern directories 2C_AUDIO 54, MC_AUDIO 56, and PICTURES 66. The structure of MASTER.TOC 52 will be discussed hereinafter. Furthermore, 2C_AUDIO directory 54 points to TOC 2C_AREA.TOC 58 and in parallel therewith to the various stereo tracks TRACKn.2CH 60. Furthermore, there is MC_AUDIO directory 56. This points to TOC MC_AREA.TOC 62 and in parallel therewith to the various stereo tracks TRACKn.MCH 64. In consequence, the tracks may be accessed either via the associated directories, or rather via the file system that may have MASTER.TOC and sub-TOCS as files. However, double storage facilities therefor are superfluous, inasmuch as the directories need only to refer to the TOC or TOCS. For reasons of safety, the master TOCs have been provided in triplicate. Furthermore, the subaltern or AREA.TOCs have been provided in duplicate. Next, to audio, the system may be organized for containing still further items, such as pictures that also have their directory 66. As an additional extra, 2C_TAREA.2CH 59 and MC_TAREA.MCH contain all associated tracks.

FIG. 5 shows a first storage arrangement for use with the invention, which by way of example has been represented as a single serial track. Along the horizontal axis the following items are evident. Item 120 is a Lead-in area that is used for mutually synchronizing the reader and the driving of the medium. Item 122 represents the File System that has been disclosed with reference to FIG. 4. Item 124 represents a TOC that may be configured according to standard procedures and pertains to subsequent items Stereo Audio Item 126 and Multi-channel Audio Item 128, and if necessary also to Extra Data Item 130. The size of item 124 need not be standardized, inasmuch as various different amounts of information may be present. Item 126 represents Stereo Audio Information, that may be defined according to a conventional standard and by itself does not constitute part of the invention. Item 128 represents Multi Channel Audio Information, that may be defined according to a conventional standard and by itself does not constitute part of the invention. Generally, the two audio areas may have the same structure and contain the same piece of audio, apart from the distinguishing definitions of the various channels. The audio may be plain coded or lossless coded. All kinds of audio may be multiplexed with supplementary data, such as Compact Disc Text.

Item 130 represents Extra Data Information that may be defined in a conventional standard and by itself does not form part of the invention. Item 132 represents a Lead-Out Information. The latter is in particular used during search operations. The lead-out may cover a ring of some 0.5 to 1 millimeter wide. According to the above, the stored information may be accessed either via the file system as laid down in item 122, or via the TOC structure laid down in item 124, and more particular, via a two- or multi-level TOC structure to be discussed hereinafter.

FIG. 6 shows a second storage arrangement for use with the invention, and in particular pertaining to a two-level TOC structure. Along the horizontal axis the following items are evident, next to items that have already been shown in FIG. 3 and carry the same reference numerals. For clarity, items 120 and 132 have been suppressed.

Item 134 represents the Master TOC that begins at a uniformly standardized offset position with respect to the start of the Lead-in area at byte number 510, copies at 520, 530. According to the embodiment, the Master-TOC measures only one standard-size sector and primarily contains pointers to the various Sub-TOCs 136, 138 or Area-TOCs to be disclosed hereinafter. A preferred syntax of the Master-TOC has a header with a Signature that identifies the Master-TOC, such as by "SACD Master TOC". Further, Tables 1 and 2 specify the precise syntax of the MASTER_TOC. The syntax has been given in elementary computer notation, together with the associated lengths and formats. Master_TOC_Signature is an 8 byte string identifying the Master TOC. The value of Master_TOC_Signature must be "SACDMTOC" ($53 $41 $43 $44 $4D $54 $4F $43). As shown in this embodiment, a highest level TOC file is provided with a one or more Sub-TOC file directories that each contain their own Sub-TOC file that for example may be respectively assigned to a uniquely standardized audio format, such as the Stereo Audio Item 126 and the Multi-channel Audio Item 128 shown in FIG. 5. In one embodiment, the number of sub-TOCs may be exactly equal to 2.

Likewise Table 3 specifies the disc info syntax in the same manner. In particular:

2CH_TOC_1_Address is a 5 byte integer containing the logical sector number (LSN) of the first sector of Area TOC-1 in the 2 Channel Stereo Area. If the 2-Channel Stereo Area is not present, the value of 2CH_TOC_1_Address must be zero.

2CH-TOC_2_Address is a 4 byte integer containing the LSN of the first sector of Area TOC-2 in the 2 Channel Stereo Area. if the 2-Channel Stereo Area is not present, the value of 2CH_TOC_2_Address must be zero.

MC_TOC_1_Address is a 4 byte integer containing the LSN of the first sector of Area TOC-1 in the Multi Channel Stereo Area. If the Multi Channel Area is not present, the value of MC_TOC_1_Address must be zero.

MC_TOC_2_Address is a 4 byte integer containing the LSN of the first sector of Area TOC-2 in the Multi Channel Stereo Area. If the Multi Channel Area is not present, the value of MC_TOC_2_Address must be zero.

The format of Disc_Flags must be as follows: a hybrid bit and seven reserved bits.

The Hybr bit must be set to one on a Hybrid Disc. The Hybr bit must be set to zero on a not-Hybrid Disc.

List of Related Documents (D1) Research Disclosure number 36411. August 1994, page 412-413
(D2) PCT/IB97/01156 (PHN 16.452) 1 bit ADC and lossless compression of audio
(D3) PCT/IB97/01303 (PHN 16.405) Audio compressor
(D4) EP-A 402,973 (PHN 13.241) Audio compression
(D5) 'A digital decimating filter for analog-to-digital conversion of hi-fi audio signals', by J. J. van der Kam in Philips Techn. Rev. 42, no. 6/7, April 1986, pp. 230-8
(D6) 'A higher order topology for interpolative modulators for oversampling A/D converters', by Kirk C. H. Chao et al in IEEE Trans. on Circuits and Systems, Vol 37, no. 3, March 1990, pp. 309-18

The invention claimed is:

1. A method for storing audio-centered information on a unitary storage medium through a Table-of-Contents (TOC) mechanism for therein specifying an actual configuration of various audio items on said medium, being characterized by assigning in addition to the TOC mechanism, wherein a lowest level TOC file points immediately to the respective contents of said audio items, furthermore assigning a file-based access mechanism to the audio-centered information through a ROOT directory which contains a highest level TOC file which points at various audio items, wherein said ROOT directory through item localizing information provides a further access mechanism in addition to the TOC mechanism, whilst furthermore providing said highest level TOC file with one or more of Sub-TOC file directories that each contain their own Sub-TOC.

2. A method as claimed in claim 1, wherein the number of sub-TOCs is exactly equal to 2.

3. A method as claimed in claim 1, whilst providing said ROOT directory with additional lower level directories, thereby providing said further access mechanism at respective different levels.

4. A method as claimed in claim 1, wherein said audio formats comprise at least a Stereo format and at least one multi-Channel audio format.

5. A device readable memory medium comprising a data structure, the data structure comprising:
  audio-centered information;
  a Table-of-Contents (TOC) for therein specifying an actual configuration of various audio items on said device readable memory medium;
  a lowest level TOC file that points immediately to respective contents of audio items; and
  a file-based access mechanism to the audio-centered information through a ROOT directory which contains a highest level TOC file which points at various audio items, wherein said ROOT directory through item localizing information provides a further access mechanism in addition to the TOC, wherein said highest level TOC file is provided with one or more of Sub-TOC file directories that each contain their own Sub-TOC.

6. The device readable memory medium of claim 5, wherein said audio-centered information comprise a Stereo format and a multi-Channel audio format, and wherein the device readable memory medium is an optically readable disc.

7. A reader device configured for receiving an optically readable memory medium and for accessing audio-centered information stored on the optically readable memory medium, the device comprising an optical reading portion configured for accessing the optically readable memory medium through a Table-of-Contents (TOC) for therein specifying an actual configuration of various audio items on the optically readable memory medium, a lowest level TOC file that points immediately to respective contents of audio items, and a file-based access mechanism to the audio-centered information through a ROOT directory which contains a highest level TOC file which points at various audio items, wherein said ROOT directory through item localizing information provides a further access mechanism in addition to the TOC, wherein said audio-centered information comprise a Stereo format and a multi-Channel audio format, wherein said highest level TOC file includes a Sub-TOC file directory that each contain their own Sub-TOC.

8. The reader device of claim 7, comprising a disc holder configured to hold the optically readable memory medium and a disc drive configured to drive a disc track of the optically readable memory medium along the optical reading portion.

* * * * *